US011010906B2

(12) United States Patent
Guerrero et al.

(10) Patent No.: US 11,010,906 B2
(45) Date of Patent: May 18, 2021

(54) IMAGE-PROCESSING METHOD FOR REMOVING LIGHT ZONES

(71) Applicants: Continental Automotive France, Toulouse (FR); Continental Automotive GmbH, Hannover (DE)

(72) Inventors: David Guerrero, Toulouse (FR); David Daurenjou, Montastruc-la-Conseillère (FR)

(73) Assignees: Continental Automotive France; Continental Automotive GmbH

(*) Notice: Subject to any disclaimer, the term of this patent is extended or adjusted under 35 U.S.C. 154(b) by 92 days.

(21) Appl. No.: 16/490,957

(22) PCT Filed: Mar. 15, 2018

(86) PCT No.: PCT/FR2018/050627
§ 371 (c)(1),
(2) Date: Sep. 4, 2019

(87) PCT Pub. No.: WO2018/197763
PCT Pub. Date: Nov. 1, 2018

(65) Prior Publication Data
US 2020/0020114 A1 Jan. 16, 2020

(30) Foreign Application Priority Data
Apr. 25, 2017 (FR) ...................... 1753584

(51) Int. Cl.
*G06T 7/254* (2017.01)
*G06K 9/00* (2006.01)
*G06K 9/32* (2006.01)

(52) U.S. Cl.
CPC .......... *G06T 7/254* (2017.01); *G06K 9/00771* (2013.01); *G06K 9/3241* (2013.01);
(Continued)

(58) Field of Classification Search
CPC ........... G06T 7/254; G06T 2207/10016; G06T 2207/20036; G06T 2207/30236; G06K 9/00771; G06K 9/3241
See application file for complete search history.

(56) References Cited

U.S. PATENT DOCUMENTS 5,847,755 A 12/1998 Wixson et al.
9,684,840 B2 * 6/2017 Huang .................... G06T 7/194
(Continued)

OTHER PUBLICATIONS

English Translation of the Written Opinion for International Application No. PCT/FR2018/050627, dated Jun. 13, 2018, 6 pages.
(Continued)

*Primary Examiner* — Carol Wang
(74) *Attorney, Agent, or Firm* — RatnerPrestia

(57) ABSTRACT

An image-processing method for filtering light pollution appearing in a video image stream acquired by a video camera. The method includes, for a current image of the video image stream, the steps of subtracting the background represented in the current image in order to obtain the foreground of the current image, determining a brightening matrix, determining a compensating matrix by restricting the values of the pixels of the determined brightening matrix, segmenting the determined brightening matrix, determining a mask from the segmented brightening matrix, applying the mask to the determined compensating matrix in order to obtain a filtering matrix, and filtering the foreground of the current image by applying the filtering matrix in order to decrease the zones of light pollution in the images of the image stream.

10 Claims, 3 Drawing Sheets

(52) U.S. Cl.
CPC .............. *G06T 2207/10016* (2013.01); *G06T 2207/20036* (2013.01); *G06T 2207/30236* (2013.01)

(56) References Cited

U.S. PATENT DOCUMENTS

| | | | |
|---|---|---|---|
| 2005/0240871 A1* | 10/2005 | Wilson | G06K 19/06009 715/700 |
| 2007/0069026 A1* | 3/2007 | Aoyama | G06K 7/14 235/462.09 |
| 2010/0188486 A1* | 7/2010 | Amanullah | G06T 7/0008 348/48 |
| 2011/0050883 A1* | 3/2011 | Ghose | G06K 9/54 348/113 |
| 2014/0003720 A1 | 1/2014 | Seow et al. | |
| 2015/0278616 A1 | 10/2015 | Li et al. | |

OTHER PUBLICATIONS

International Search Report and Written Opinion for International Application No. PCT/FR2018/050627, dated Jun. 13, 2018—8 pages.

* cited by examiner

IMAGE-PROCESSING METHOD FOR REMOVING LIGHT ZONES

CROSS REFERENCE TO RELATED APPLICATIONS

This application is the U.S. National Phase Application of PCT International Application No. PCT/FR2018/050627, filed Mar. 15, 2018, which claims priority to French Patent Application No. 1753584, filed Apr. 25, 2017, the contents of such applications being incorporated by reference herein.

FIELD OF THE INVENTION

The invention relates to the field of image processing and more particularly relates to an image-processing method allowing bright zones liable to mask moving objects or persons in a stream of video images captured by a camera to be removed.

BACKGROUND OF THE INVENTION

At the present time, it is known to detect moving objects or people in a stream of video images captured by a camera. Such detection may have several aims. For example, when the camera is fastened to a street light, it is known to detect pedestrians walking in proximity to the street light in order to increase its brightness and thus increase the illumination of the entire zone or indeed to orient the flux of light in their direction. In another example, it may be useful to detect individuals circulating in a preset zone for the purposes of surveillance.

One known type of solution consists in applying a set of Gaussian distribution functions to the pixels of the images acquired by the camera in order to differentiate between pixels the brightness of which varies little or not at all, which are considered to represent the background of the filmed scene, and pixels the brightness of which varies greatly, which are then considered to represent moving objects, this type of solution being called gaussian mixture models (GMM).

A problem arises, in particular at night, when the environment filmed by the camera contains zones of high brightness that do not correspond to light-emitting objects. In this case, these bright zones may be considered to be moving objects in the images when a set of Gaussian distribution functions are applied thereto, this possibly leading to interpretation or handling errors during the image processing. For example, when it is desired to track a vehicle at night, the camera may end up tracking the zone illuminated by the headlamps of the vehicle rather than the vehicle itself, this being problematic in the case of surveillance. Likewise, it may also be difficult, or even impossible, to detect the shape of objects illuminated by the headlamps of a vehicle if said objects are immersed in the light of the headlamps, this also being a drawback.

SUMMARY OF THE INVENTION

It would therefore be advantageous to provide an image-processing solution allowing zones of light pollution appearing in such images to be removed in order to correctly detect objects or people in the environment of the camera.

To this end, one aspect of the present invention is an image-processing method for filtering light pollution appearing in a video image stream acquired by a video camera.

Said method is noteworthy in that it comprises, for a current image of said video image stream, the steps of:
  subtracting the background represented in said current image in order to obtain the foreground of the current image,
  determining a brightening matrix identifying the pixels of the current image the brightness of which is higher than the time-averaged brightness of the pixels of the image,
  determining a compensating matrix by restricting the values of the pixels of the determined brightening matrix to between a minimum value and a maximum value,
  segmenting the determined brightening matrix,
  determining a mask from the segmented brightening matrix,
  applying said mask to the determined compensating matrix in order to obtain a filtering matrix, and
  filtering the foreground of the current image by applying said filtering matrix in order to decrease the zones of light pollution in the images of the image stream.

The expression "current image" is understood to mean the image of the stream currently being processed, the images of the stream being processed in succession in the order of the stream. Furthermore, the brightening matrix characterizes pixels that are brighter than normal in the video image stream.

By virtue of the method according to an aspect of the invention, bright zones of an image that could be a drawback for the detection of an object or a person are mostly or completely removed, making said detection easy, fast and reliable. In particular, the method according to an aspect of the invention allows zones detected as being objects by the background subtraction but that are in fact illuminated zones, for example vehicle headlamps, to be removed. Nonlimitingly, the method according to an aspect of the invention is advantageously applicable to images in which it is desired to detect moving objects or people. Likewise, the method according to an aspect of the invention is advantageously applicable to images in which it is desired to detect objects or people under poor lighting conditions and in particular at night.

Advantageously, the method comprises, before the steps of subtracting and determining a brightening matrix, a step of preprocessing the current image.

Preferably, the step of determining a brightening matrix comprises the substeps of:
  computing the time average of the brightness of each pixel of the current image from a plurality of successive images extracted from the image stream,
  computing the time average of the standard deviations of the brightness of each pixel of the current image from a plurality of successive images extracted from the image stream,
  determining the brightening matrix identifying the pixels of the current image the brightness of which is higher than the average brightness on the basis of the computed average of the brightness of each pixel of the current image and of the computed time average of the standard deviations of the brightness of each pixel of the current image.

In one preferred embodiment, the brightening matrix is determined pixel by pixel using the following equation:

$$BrighterMatrix_{[x,y]} =$$

-continued $$\begin{cases} \frac{Frame_{[x,y]} - GlobalAverage_{[x,y]}}{GlobalStdDeviation_{[x,y]}}, & \begin{cases} StdDeviationFrame_{[x,y]} > \rho \\ \text{and} \\ Frame_{[x,y]} > GlobalAverage_{[x,y]} \end{cases} \\ 0, & \text{Otherwise} \end{cases}$$

where $Frame_{[x,y]}$ is the current image, [x,y] are the coordinates of a pixel of the image, $GlobalAverage_{[x,y]}$ is the time average of the brightness of each pixel of the current image $Frame_{[x,y]}$ based on a plurality of successive images extracted from the image stream, $GlobalStdDeviation_{[x,y]}$ is the time average of the standard deviations of the brightness of each pixel of the current image $Frame_{[x,y]}$ based on a plurality of successive images extracted from the image stream and ρ is a noise-decreasing coefficient (to be established depending on the application). Preferably, the value of ρ is close to 0, for example lower than 0.025, in order to effectively decrease noise in the brightening matrix.

Advantageously, the step of determining the compensating matrix comprises, following the restriction of the values of the pixels, a normalization, of said restricted values, preferably between 0 and 1.

According to one aspect of the invention, the step of segmenting the determined brightening matrix comprises the substeps of:
  smoothing the determined brightening matrix,
  limiting the value of the pixels of the determined brightening matrix to below a threshold value, and
  binarizing the limited brightening matrix in order to obtain the segmented brightening matrix.

Also advantageously, the step of determining the mask comprises the substeps of:
  applying a morphological process to the segmented brightening matrix,
  determining, in said morphologically processed brightening matrix, blobs of pixels the number of pixels of which is lower or higher than a preset threshold, and
  binarizing to the value 1 the pixels of the blobs the determined number of pixels of which is higher than the preset threshold and to the value 0 the pixels of the blobs the determined number of pixels of which is lower than the preset threshold.

According to one aspect of the invention, the method comprises, prior to the filtering step, a step of smoothing the filtering matrix.

According to another aspect of the invention, the method comprises a step of detecting a person or an object represented in the filtered-image stream.

An aspect of the invention also relates to a processing module for filtering light pollution appearing in an image stream acquired by a video camera, said processing module being characterized in that it is configured to receive an image stream from said video camera, and, for a current image of said image stream:
  to subtract the background represented in said current image in order to obtain the foreground of the current image,
  to determine a brightening matrix identifying the pixels of the current image the brightness of which is higher than the time-averaged brightness of the pixels of the image,
  to determine a compensating matrix by restricting the values of the pixels of the determined brightening matrix to between a minimum value and a maximum value,
  to segment the determined brightening matrix,
  to determine a mask from the segmented brightening matrix,
  to apply said mask to the determined compensating matrix in order to obtain a filtering matrix, and
  to filter the foreground of the current image by applying said smoothed filtering matrix in order to decrease the zones of light pollution in the images of the image stream.

Preferably, the processing module is configured to smooth the filtering matrix.

Also preferably, the processing module is configured to detect a person or an object represented in the filtered-image stream.

An aspect of the invention also relates to an image-processing system for filtering light pollution appearing in an image stream acquired by a video camera. Said system is noteworthy in that it comprises a video camera, and a processing module such as presented above linked to said video camera by a communication link.

BRIEF DESCRIPTION OF THE DRAWINGS

Other features and advantages of an aspect of the invention will emerge during the following description, given with reference to the appended figures, which are given by way of non-limiting example and in which identical references are given to similar objects.

DETAILED DESCRIPTION OF THE PREFERRED EMBODIMENTS

The image-processing system according to an aspect of the invention allows most of the bright zones liable to mask objects or people in images to be removed, in order in particular to improve the detection thereof. These objects or people may for example be vehicles or pedestrians driving in a traffic lane or walking on a sidewalk, respectively.

Figure 1:
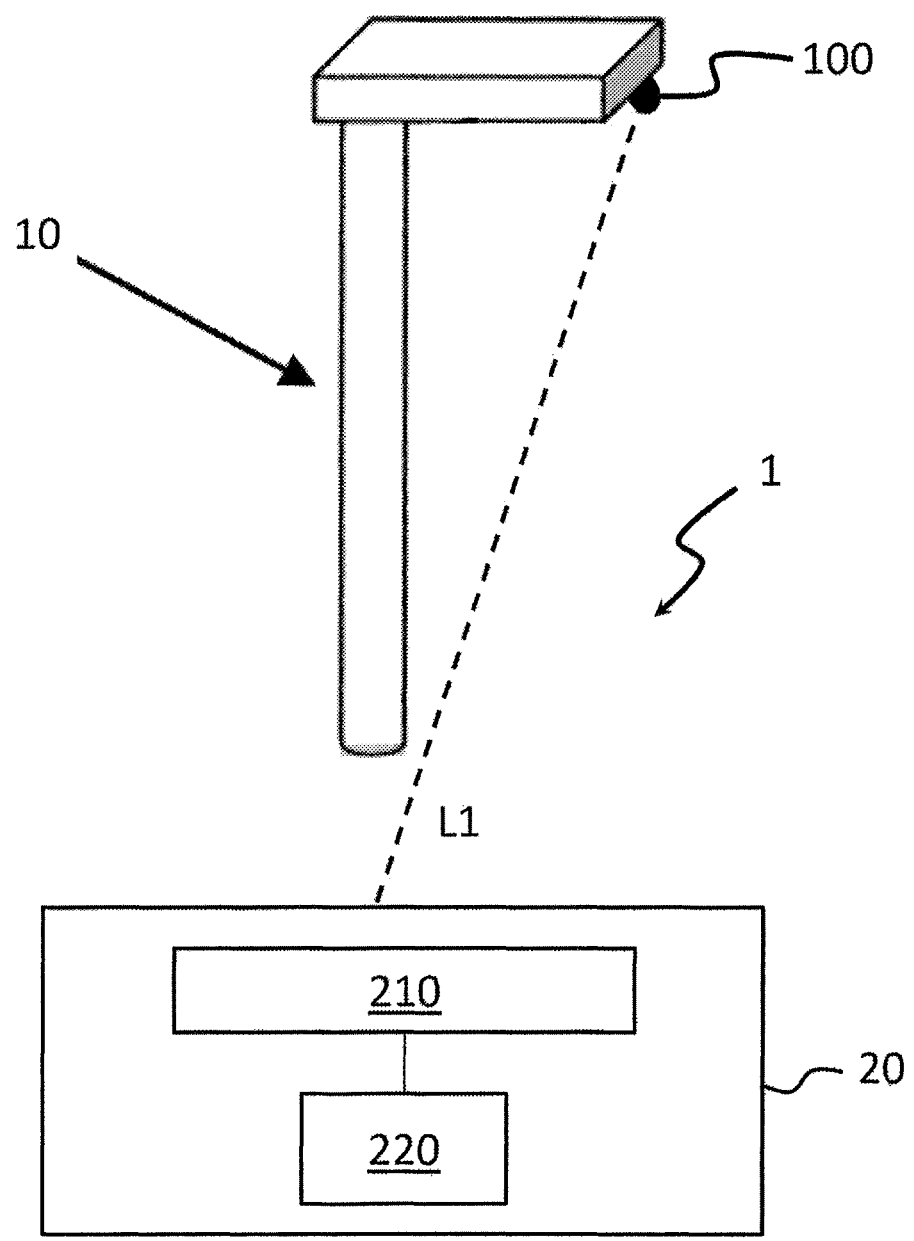
FIG. 1 schematically shows one embodiment of the system according to an aspect of the invention, in which embodiment the light source is a streetlamp equipped with a video camera.

FIG. 1 schematically shows an example of a system 1 according to an aspect of the invention. The system 1 comprises a street light 10 on which a video camera 100 is mounted, and a processing module 20 linked to said camera 100 by a communication link L1 in order to receive a stream of video images captured by the camera 100.

This communication link L1 may be wired (electrical cable) or wireless (for example via a Wi-Fi, Wimax or 4G connection or any other known type of connection).

In the illustrated embodiment, the camera 100 is mounted on the street light 10 in order to film the environment of said street light 10, for example in order to monitor a traffic lane. It will be noted that an aspect of the invention may be applied to any type of camera 100 mounted on any type of holder in order to film any type of zone in which it is desired to detect the presence of people or objects, such as for example pedestrians or motor vehicles.

Preferably, the camera 100 is able to remain stationary at least for a preset time interval in order to acquire a video image stream of a given zone, for example a segment of a traffic lane.

In the preferred embodiment described below (which is completely nonlimiting), the processing module 20 is configured to perform a series of operations on the images of the video stream captured by the camera.

To this end, the processing module 20 preferably comprises a memory zone 220 and a processor 210 suitable for implementing instructions stored in said memory zone 220 and allowing the operations described below to be carried out on each current image of the stream.

The expression "current image" is understood to mean the image being processed by the processing module 20 in the video image stream received by the camera 100, the images of the screen being processed in succession.

Firstly, the processing module 20 is configured to subtract the background represented in the current image in order to obtain the foreground of said current image. Such a subtraction may for example be achieved using a Gaussian mixture model (GMM) as will be described below with respect to the implementation of an aspect of the invention.

For each image of the stream, the processing module 20 is firstly configured to determine a brightening matrix identifying the pixels of the current image the brightness of which is higher than the time-averaged brightness of the pixels of the image. This brightening matrix characterizes the pixels representing elements the brightness of which has increased, potentially because of a light source. By way of example, such pixels may represent the light of the headlamps of a motor vehicle being driven on a road filmed by the camera 100.

In one preferred embodiment, in order to determine this brightening matrix, the processing module 20 is configured to compute the time average of the brightness of each pixel of the current image from a plurality of successive images extracted from the image stream, in order to compute the time average of the standard deviations of the brightness of each pixel of the current image from a plurality of successive images extracted from the image stream and in order to determine a brightening matrix identifying the pixels of the current image the brightness of which is higher than the average brightness on the basis of the computed average of the brightness of each pixel of the current image and of the computed average of the standard deviations of the brightness of each pixel of the current image.

To this end, the processing module 20 is configured to compute, for a current image Frame, the matrix GlobalAverage$_t$ of the average brightnesses at the time t by computing an exponential envelope using the following equation:

$$\text{GlobalAverage}_{[x,y]} = (1-\alpha) \times (\text{GlobalAverage}_{t-1[x,y]}) + (\alpha) \times (\text{Frame}_{[x,y]})$$

where α is a scalar parameter between 0 and 1 to be established for each application, and which sets the decay of the exponential envelope, Frame$_{[x,y]}$ is the value of the pixel of coordinates [x,y] of the current image (i.e. its brightness value). The initial value of GlobalAverage$_t$ may be the first image of the video stream received by the camera 100.

Again in this embodiment, the processing module 20 is configured to compute the average standard deviation StdDeviationFrame of the brightness of each pixel of the current image Frame with respect to its neighbors, using the following equation:

$$\text{StdDeviationFrame}_{[x,y]} = \sqrt{\mu(\text{Frame}_{[x,y]}^2) - [\mu(\text{Frame}_{[x,y]})]^2}$$

where Frame$_{[x,y]}$ is the value of the pixel of coordinates [x,y] of the current image (i.e. its brightness value), and where μ is a mean filter, with for example a 3×3 kernel.

Again in this example, the processing module 20 is configured to compute a matrix called GlobalStdDeviation the value of each pixel of which corresponds to the time average of the standard deviation of the pixel of same coordinates in a series of prior images of the video stream, using an exponential envelope defined by the following equation, for each pixel:

$$\text{GlobalStdDeviation}_{t[x,y]} = (1-\alpha) \times (\text{GlobalStdDeviation}_{t-1[x,y]}) + (\alpha) \times (\text{StdDeviationFrame}_{[x,y]})$$

where α has the same value as that used to compute GlobalAverage.

Preferably, the processing module 20 is configured to determine a brightening matrix BrighterMatrix pixel by pixel using the following equation:

$$\text{BrighterMatrix}_{[x,y]} = \begin{cases} \dfrac{\text{Frame}_{[x,y]} - \text{GlobalAverage}_{[x,y]}}{\text{GlobalStdDeviation}_{[x,y]}}, & \begin{cases} \text{StdDeviationFrame}_{[x,y]} > \rho \\ \text{and} \\ \text{Frame}_{[x,y]} > \text{GlobalAverage}_{[x,y]} \end{cases} \\ 0, & \text{Otherwise} \end{cases}$$

where Frame$_{[x,y]}$ is the current image, [x,y] are the coordinates of a pixel of the current image Frame$_{[x,y]}$, and ρ is a parameter to be established depending on the application. Preferably, the value of ρ is close to 0, for example lower than 0.025, in order to decrease noise in the brightening matrix. The values of this brightening matrix correspond to the deviation, weighted by the standard deviation of the time-averaged brightness, of the current brightness of each pixel with respect to the time-averaged brightness.

The processing module 20 is also configured to determine a compensating matrix by limiting (i.e. by restricting) the values of the determined brightening matrix to between a minimum value and a maximum value, for example to between 1 and 5, in order to limit aberrant values. In other words, with respect to dynamic range, the determined compensating matrix allows values that are irrelevant to be removed after normalization, thereby in particular limiting values that are too high.

Preferably, the processing module 20 is also configured to normalize the values of the compensating matrix between 0 and 1.

The processing module 20 is configured to segment the determined brightening matrix in order to obtain a binary image. According to one preferred embodiment, the brightening matrix is firstly smoothed with a Gaussian filter and then the values of the brightening matrix are capped at a value, for example equal to 5 times the standard deviation of the time-averaged brightness, in order to preserve only the dynamic range relevant to the detection of disrupting light. Next, the processing module 20 is configured to determine the segmented brightening matrix using an automatic thresholding algorithm on the smoothed matrix, for example the algorithm of Li (Li & Tam, 1998). The segmented brightening matrix may then be normalized between 0 and 1.

The processing module 20 is configured to determine a mask from the segmented brightening matrix. This mask will be applied to the compensating matrix in order to obtain a filtering matrix (described below).

Preferably, the mask is obtained by applying a morphological process to the segmented brightening matrix. This process comprises an erosion with a kernel of size N, followed by a dilation with a kernel size N+2 and by an erosion with a kernel of size N. The size N of the kernel is dependent on the size of the image and on the desired level of filtering. This serves to group the pixels into more compact regions of pixels (blobs).

Next, using a blob-detecting algorithm, the processing module 20 is configured to detect the blobs. Depending on the nature of the application and the desired characteristics, certain of these blobs will be processed differently.

For example, if blob area is used as criterion, blobs with an area smaller than a preset threshold may be processed differently, the value of this threshold depending on the application. In an example of detection of pedestrians and automobiles, this allows blobs potentially corresponding to pedestrians (representing a smaller area) to be processed from blobs corresponding to illuminated zones, such as caused by the light projected by the headlamps of a vehicle.

Lastly, for each blob, the coordinates of each of the pixels thereof are used and the value of the corresponding pixel (of same coordinates) in the compensating matrix is adjusted, this yielding the filtering matrix, as will be described below. For example, the value may be adjusted to 1 for pixels to be removed from the foreground (illuminated zones, blobs with a large area) and to 0 for pixels to be kept in the foreground (for example, pedestrians with light-colored jackets).

The processing module 20 is configured to apply the mask to the compensating matrix in order to obtain a filtering matrix.

The filtering matrix allows those zones of the current image of the foreground which have particular characteristics to be filtered, depending on the targeted application. Preferably, the mask modifies regions (zones) of large size in order to ensure the removal thereof (region size is a configuration parameter). Again preferably, the mask also modifies regions (zones) of small size in order to ensure that they are not removed. For example, in the case of a smart light where the aim of the detection is to locate pedestrians, zones of small size are saved in order to prevent potential detections of pedestrians from being deleted.

Thus, the pixels of the filtering matrix the value of which is equal to 1 will completely remove the detection of the corresponding pixel during the filtering of the foreground of the current image and the pixels the value of which is equal to 0 will not modify the detection of the corresponding pixel during the filtering.

In one preferred embodiment, the processing module 20 is also configured to smooth the filtering matrix before the latter is applied to the current image of the foreground. Preferably, this smoothing is carried out with a Gaussian filter (for example of standard deviation σ=3 and a kernel of 7×7 pixels), and next the values of the pixels are normalized, preferably between 0 and 1.

The processing module 20 is configured to filter the foreground of the current image by applying the filtering matrix in order to decrease or even remove the zones of light pollution in the images of the image stream.

Figure 2:
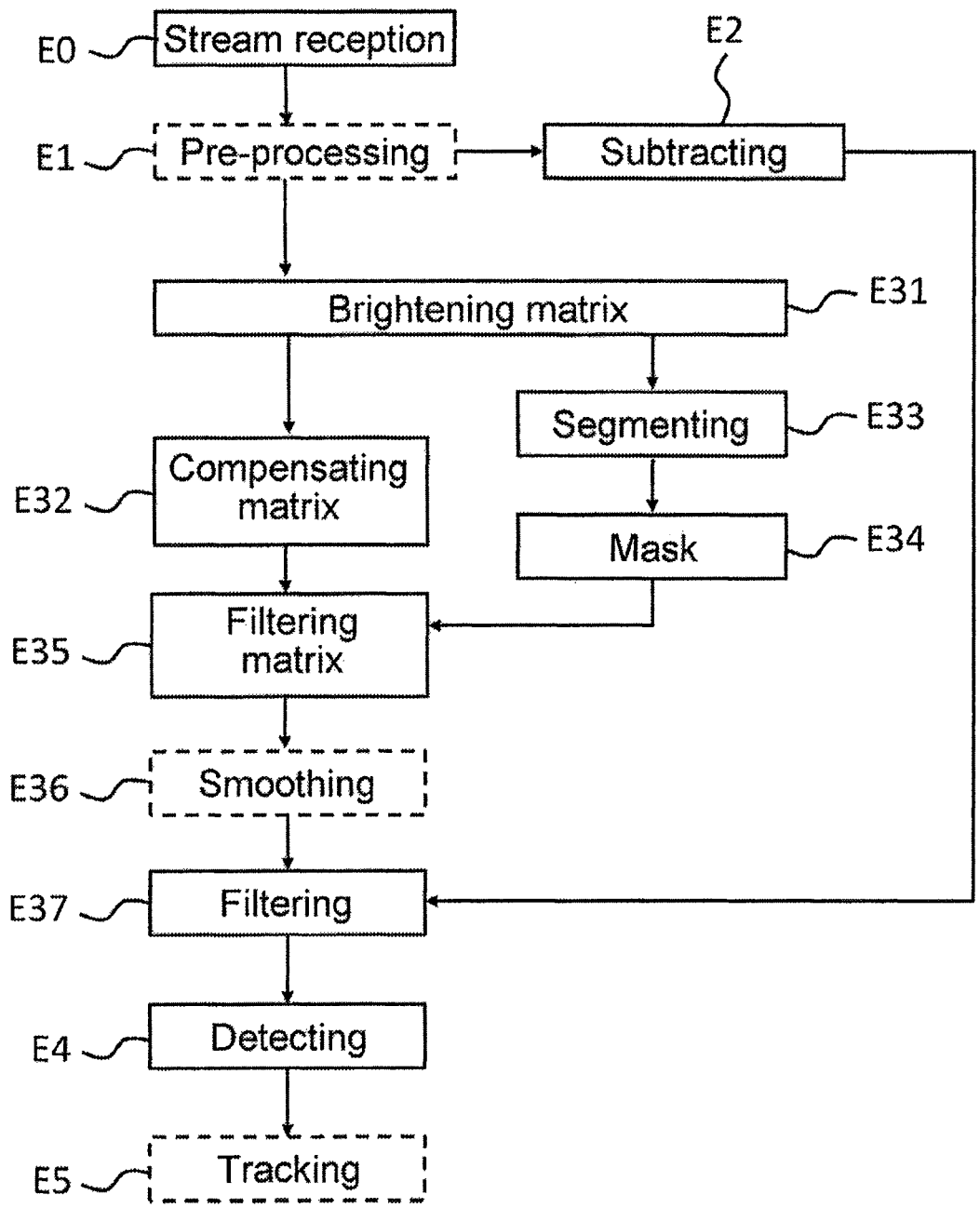
FIG. 2 illustrates one embodiment of the method according to an aspect of the invention.

An aspect of the invention will now be described in terms of the implementation thereof with reference to FIG. 2.

The camera 100 firstly acquires a video image stream and sends it over the communication link L1 to the processing module 20, which receives it in a step E0.

Next, for each image of the image stream, the processing module 20 carries out the steps described below. Each of the expressions "current image" and "frame" is understood to mean the image of the image stream that is currently being processed, the images being processed in succession in the order in which they are sequenced in the stream of images captured by the camera 100.

Firstly, in a step E1, the processing module 20 pre-processes the current image Frame. The processing module 20 converts the current image Frame into a grayscale image, smooths the current image Frame in order to partially remove noise then increases the contrast.

Next, in a step E2, the processing module 20 subtracts the background represented in the preprocessed image in order to obtain an image said to be of the foreground of the current image Frame, i.e. representing the foreground of the current image Frame.

This subtraction may be achieved using a Gaussian mixture model (GMM) which consists in estimating, with a set of Gaussian distribution functions, the distribution of the brightness values for each of the pixels of the images acquired by the camera in order to differentiate between pixels the brightness of which varies little or not at all over time, which are considered to represent the background of the filmed scene, and pixels the brightness of which varies greatly, which are then considered to potentially represent moving objects.

The processing module 20 will then post-process the current image, which post-processing may partially be carried out in parallel with the pre-processing step (E1) and the subtracting step (E2).

To carry out this post-processing, the processing module 20 firstly determines, in a step E31, a brightening matrix identifying the pixels of the current image Frame the brightness of which is higher than the time-averaged brightness. In other words, the brightening is determined on the basis of the variation in the current brightness with respect to the time-averaged brightness of each pixel of the current image Frame.

To this end, in one preferred embodiment, the processing module employs Gaussian filtering based on a 3×3 kernel with the aim of smoothing the current image Frame. Next, the processing module computes the time average GlobalAverage of the brightness of each pixel of the current image using the following equation:

$$GlobalAverage_{t[x,y]} = (1-\alpha)*GlobalAverage_{t-1[x,y]} + \alpha*Frame_{[x,y]}$$

where [x,y] are the coordinates of a pixel of the image and α is a parameter between 0 and 1 to be established for each application, and which sets the decay of the exponential envelope. The initial value of GlobalAverage may be the first image of the video stream received by the camera 100. Next, the processing module 20 computes the time-averaged standard deviation GlobalStdDeviation of the brightness of each pixel of the current image Frame, i.e. from a plurality of successive images extracted from the image stream. To do this, the processing module 20 firstly computes an image StdDeviationFrame the value of each pixel of which is the standard deviation with respect to its neighbors, then subsequently computes an image GlobalStdDeviation the value of each pixel of which corresponds to the time average of the standard deviation of the pixel of same coordinates in a series of prior images of the video stream. This average may be calculated with an exponential envelope defined by the following equation:

$$GlobalStdDeviation_{t[x,y]} = (1-\alpha)*GlobalStdDeviation_{t-1[x,y]} + \alpha*StdDeviationFrame_{[x,y]}$$

where [x,y] are the coordinates of a pixel of the image and α has the same value as that used to compute GlobalAverage. Next, the processing module 20 determines a brightening matrix identifying the pixels of the current image the brightness of which is higher than the average brightness using the following equation:

$$BrighterMatrix_{[x,y]} = \begin{cases} \dfrac{Frame_{[x,y]} - GlobalAverage_{[x,y]}}{GlobalStdDeviation_{[x,y]}}, & \begin{cases} StdDeviationFrame_{[x,y]} > \rho \\ \text{and} \\ Frame_{[x,y]} > GlobalAverage_{[x,y]} \end{cases} \\ 0, & \text{Otherwise} \end{cases}$$

where [x,y] are the coordinates of a pixel of the image, $Frame_{[x,y]}$ is the current image and $\rho$ is a parameter to be established depending on the application. Preferably, the value of $\rho$ is close to 0 in order to decrease noise in the brightening matrix.

In a step E32, the processing module 20 then determines the compensating matrix. To do this, in this preferred example, the processing module 20 limits the values of the pixels of the determined brightening matrix to between a minimum value and a maximum value then normalizes the value of each pixel, preferably between 0 and 1.

In parallel, in a step E33, the processing module 20 segments the determined brightening matrix. To do this, in this preferred example, the processing module firstly smooths the determined brightening matrix using a smoothing filter based on the average, with a kernel dependent on the size of the image. The processing module 20 then limits the value of each pixel of the determined and smoothed brightening matrix so that it is lower than a threshold value in order to limit aberrant values. The processing module 20 then binarizes the smoothed and thresholded brightening matrix in order to obtain the segmented brightening matrix. This binarization consists in making the value of each pixel equal to 0 or to 1. It may for example be carried out using a threshold computed using the algorithm of Li (Li and Tam, 1998).

In a step E34, the processing module 20 determines a mask from the segmented brightening matrix. To end, the processing module 20 firstly uses a morphological process on the segmented brightening matrix, which comprises an erosion of the segmented image with a kernel of size N, followed by a dilation with a kernel of size N+2 and finally an erosion with a kernel of size N, the size N of the kernel being dependent on the size of the image and on the desired level of filtering. The processing module 20 then determines, in the morphologically processed brightening matrix, groups of connected pixels (blobs). This step may for example be carried out using the algorithm of Suzuki (Suzuki, 1985). The processing module 20 then separates the blobs depending on their area. Those the area of which is smaller than a threshold will be given the minimum value (for example 0) and those the area of which is larger than or equal to the same threshold will be given the maximum value (for example 1).

In a step E35, the processing module 20 generates a filtering matrix by applying the determined mask to the compensating matrix. To do this, for each blob, the coordinates of each of the pixels thereof and its value are used to assign the same value to the corresponding pixel (of same coordinates) in the compensating matrix.

In a step E36, the processing module 20 smooths the filtering matrix, for example using a Gaussian filter.

The processing module 20 then filters, in a step E37, the foreground of the current image by applying thereto the smoothed filtering matrix in order to decrease the zones of light pollution in the images of the image stream.

In a step E4, the processing module 20 then easily detects where appropriate an object or a person in the image stream, by virtue of the pixels remaining in the obtained foreground.

The method may also, in an optional step E5, track a person or an object detected in the images by virtue of a tracking algorithm (know per se) suitable for the desired application.

Figure 3:
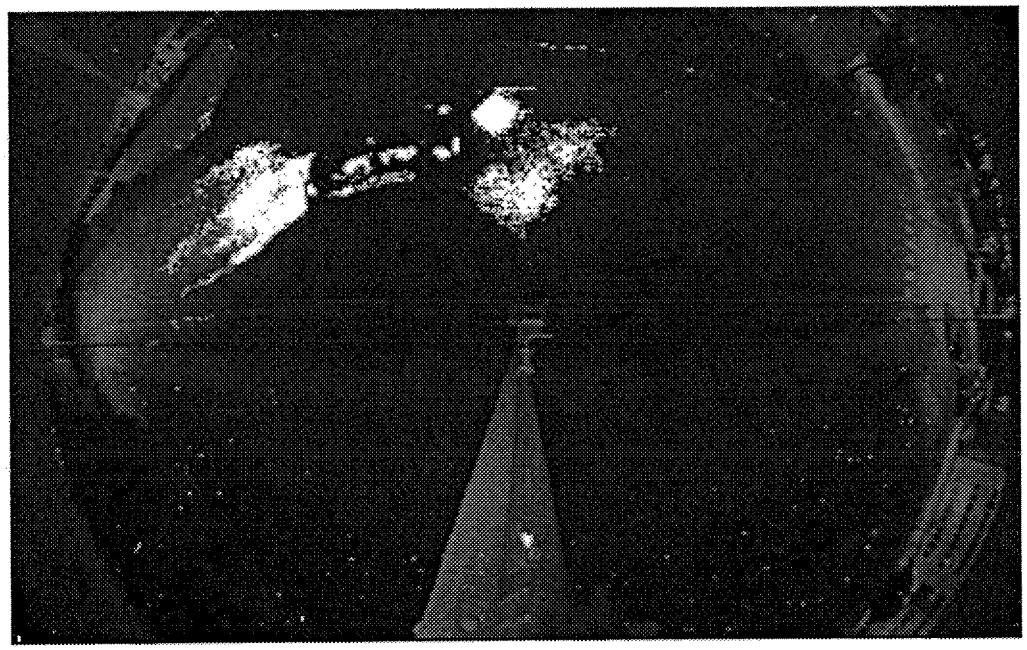
FIG. 3 is an image captured at night by a camera mounted on a streetlight, in which image a motor vehicle and the zones illuminated by its headlamps may be seen.
Figure 4:
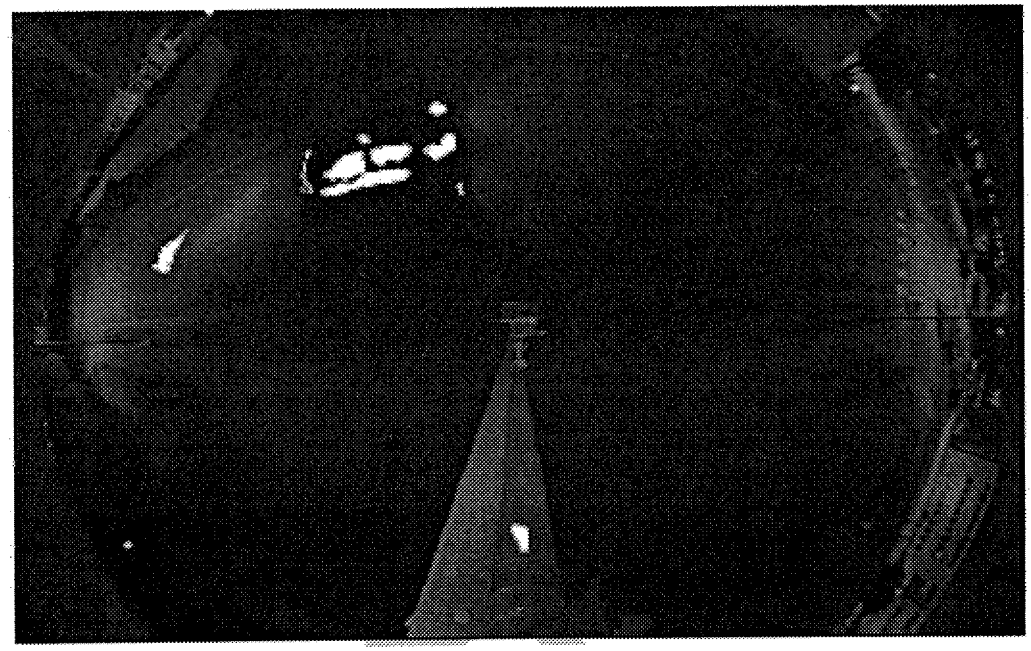
FIG. 4 is the image of FIG. 3 after processing with the method according to an aspect of the invention, showing that the detections in the zones illuminated by the headlamps of the vehicle have substantially disappeared.

FIG. 3 shows an image captured at night by a camera mounted on a streetlight, in which image a motor vehicle and the zones illuminated by its headlamps may be seen. In FIG. 3, most of the white pixels correspond to pixels detected as foreground before applying the method of an aspect of the invention. FIG. 4 shows the image of FIG. 3, after processing with the method according to an aspect of the invention. It may be seen that the zones illuminated by the headlamps of the vehicle have substantially disappeared from the foreground in the processed images, this making it possible to make detection of a person or object (in the present case the vehicle) particularly easy and reliable, in particular when a GMM algorithm is applied.

The invention claimed is:

1. An image-processing method for filtering light pollution appearing in a video image stream acquired by a video camera, said method comprising, for a current image of said video image stream:
   subtracting a background represented in said current image in order to obtain a foreground of the current image,
   determining a brightening matrix identifying pixels of the current image where the identified pixels have a brightness which is higher than a time-averaged brightness of all pixels of the current image,
   determining a compensating matrix by restricting values of the identified pixels of the determined brightening matrix to between a minimum value and a maximum value,
   segmenting the determined brightening matrix,
   determining a mask from the segmented brightening matrix,
   applying said mask to the determined compensating matrix in order to obtain a filtering matrix, and
   filtering the foreground of the current image by applying said filtering matrix to the foreground of the current image in order to decrease the zones of light pollution in images of the video image stream.

2. The method as claimed in claim 1, wherein the step of determining a brightening matrix comprises:
   computing a time average of a brightness of each pixel of the current image from a plurality of successive images extracted from the video image stream,
   computing a time average of standard deviations of the brightness of each pixel of the current image from a plurality of successive images extracted from the video image stream,
   determining the brightening matrix identifying the pixels of the current image that have the brightness which is higher than the time-averaged brightness of all pixels of the current image on a basis of the computed time average of the brightness of each pixel of the current image and of the computed time average of the standard deviations of the brightness of each pixel of the current image.

3. The method as claimed in the claim 2, wherein the brightening matrix is determined pixel by pixel using the following equation:

$$BrighterMatrix_{[x,y]} = \begin{cases} \dfrac{Frame_{[x,y]} - GlobalAverage_{[x,y]}}{GlobalStdDeviation_{[x,y]}}, & \begin{array}{l} StdDeviationFrame_{[x,y]} > \rho \\ \text{and} \\ Frame_{[x,y]} > GlobalAverage_{[x,y]} \end{array} \\ 0, & \text{Otherwise} \end{cases}$$

where $Frame_{[x, y]}$ is the current image, [x, y] are the coordinates of a pixel of the image, $GlobalAverage_{[x,y]}$ is the time average of the brightness of each pixel of the current image $Frame_{[x, y]}$ based on a plurality of successive images extracted from the image stream, $GlobalStdDeviation_{[x,y]}$ is the time average of the standard deviations of the brightness of each pixel of the current image $Frame_{[x, y]}$ based on a plurality of successive images extracted from the image stream and $\rho$ is a noise-decreasing coefficient.

4. The method as claimed in claim 1, wherein the determining the compensating matrix comprises, following the restriction of the values of the pixels, a normalization, of said restricted values, preferably between 0 and 1.

5. The method as claimed in claim 1, wherein the segmenting the determined brightening matrix comprises:
smoothing the determined brightening matrix,
limiting the value of the pixels of the determined brightening matrix to below a threshold value, and
binarizing the limited brightening matrix in order to obtain the segmented brightening matrix.

6. The method as claimed in claim 1, wherein the determining the mask comprises:
applying a morphological process to the segmented brightening matrix,
determining, in said morphologically processed brightening matrix, blobs of pixels in which a number of pixels of each blob are lower or higher than a preset threshold, and
binarizing to a value of 1, pixels of blobs in which a determined number of pixels is higher than the preset threshold and to a value of 0, pixels of blobs in which a determined number of pixels is lower than the preset threshold.

7. The method as claimed in claim 1, furthermore comprising, prior to the filtering, smoothing the filtering matrix.

8. The method as claimed in claim 1, further comprising detecting a person or an object represented in the filtered foreground of the current image.

9. A processing module for filtering light pollution appearing in an image stream acquired by a video camera, said processing module being configured to receive the image stream from said video camera, and, for a current image of said image stream:
to subtract a background represented in said current image in order to obtain a foreground of the current image,
to determine a brightening matrix identifying pixels of the current image that have a brightness which is higher than a time-averaged brightness of all pixels of the current image,
to determine a compensating matrix by restricting values of the identified pixels of the determined brightening matrix to between a minimum value and a maximum value,
to segment the determined brightening matrix,
to determine a mask from the segmented brightening matrix,
to apply said mask to the determined compensating matrix in order to obtain a filtering matrix, and
to filter the foreground of the current image by applying said filtering matrix to the foreground of the current image in order to decrease the zones of light pollution in images of the image stream.

10. An image-processing system for filtering light pollution appearing in an image stream acquired by a video camera, said system comprising:
the video camera, and
the processing module as claimed in claim 9, said processing module being linked to said video camera by a communication link.

* * * * *